(12) United States Patent
Comstock, II et al.

(10) Patent No.: US 8,139,289 B2
(45) Date of Patent: Mar. 20, 2012

(54) PRECISION OPTICAL MOUNT

(75) Inventors: Lovell E Comstock, II, Charlestown, NH (US); Michael D Lathrop, Swanzey, NH (US); Bruce H Myrick, Keene, NH (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 12/844,351

(22) Filed: Jul. 27, 2010

(65) Prior Publication Data
US 2012/0026581 A1 Feb. 2, 2012

(51) Int. Cl.
*G02B 23/00* (2006.01)
(52) U.S. Cl. .................... 359/399; 359/859
(58) Field of Classification Search ........... 359/399, 359/859
See application file for complete search history.

(56) References Cited

U.S. PATENT DOCUMENTS

| | | |
|---|---|---|
| 3,748,015 A | 7/1973 | Offner |
| 4,134,638 A | 1/1979 | Drauglis |
| 4,205,902 A | 6/1980 | Shafer |
| 4,863,253 A | 9/1989 | Shafer et al. |
| 5,131,023 A | 7/1992 | Yasugaki et al. |
| 5,144,497 A | 9/1992 | Kato et al. |
| 5,173,810 A * | 12/1992 | Yamakawa ............ 359/819 |
| 5,291,339 A | 3/1994 | Mochimaru et al. |
| 5,471,346 A | 11/1995 | Ames |
| 5,734,516 A | 3/1998 | Sayede |
| 5,760,979 A * | 6/1998 | Saito ............ 359/859 |
| 6,055,111 A | 4/2000 | Nomura et al. |
| 7,274,507 B2 | 9/2007 | Stenton et al. |
| 2004/0174619 A1 | 9/2004 | Beck et al. |

FOREIGN PATENT DOCUMENTS

| | | | |
|---|---|---|---|
| EP | 0453755 | * | 10/1991 |
| EP | 0453755 A1 | | 10/1991 |
| FR | 2129839 | * | 11/1972 |
| FR | 2129839 A1 | | 11/1972 |

OTHER PUBLICATIONS

EP11175638.3 Search Report.

* cited by examiner

*Primary Examiner* — Jennifer L. Doak
(74) *Attorney, Agent, or Firm* — Timothy M. Schaeberle

(57) ABSTRACT

An optical apparatus has a primary optical element having a primary spherical optical surface with a primary center of curvature, wherein the primary spherical optical surface has a peripheral portion that extends outside a usable aperture of the optical apparatus, and a secondary optical element. A mount suspends the secondary optical element spaced apart from the primary optical element, wherein the mount comprises a number of leg sections, each leg section extending between the primary and secondary optical elements. Each leg section terminates in a spherical mating surface that rests against the peripheral portion of the primary optical element. The spherical mating surface has a mating surface center of curvature that is substantially concentric with the primary center of curvature.

20 Claims, 10 Drawing Sheets

PRECISION OPTICAL MOUNT

FIELD OF THE INVENTION

This invention generally relates to optical component mounting and more particularly relates to a mount for an optical element in an apparatus that requires as many as five degrees of freedom for component positioning.

BACKGROUND

Among the requirements for proper redirection and shaping of light within an optical apparatus is the requirement that lenses, mirrors, and other optical components have a desired spatial orientation with respect to each other. Many optical assemblies require precision mounting techniques to assure alignment between components with up to five degrees of freedom. An example is a Cassegrain telescope where the primary mirror and a secondary mirror need to be precisely aligned to each other. The same problem is faced with similar catoptric or all-reflective telescope designs and with catadioptric optical systems that employ a mix of reflective and refractive components, as well as more generally with objective lenses and components designed using similar optical principles.

A number of optical apparatus take advantage of the reduced image aberration and other benefits that are available with substantially monocentric or concentric designs. This principle is used in optical apparatus designed using Cassegrain, Officer, and Schwartzchild models, familiar to those skilled in the optical design arts.

By way of example, FIG. 1 shows an arrangement of optical components modeled after a Schwartzchild design and used to form a microscope objective 10. A secondary mirror 14 is spaced apart from a primary mirror 12. Both the concave primary and the convex secondary mirrors, 12 and 14 respectively, have substantially the same center of curvature C. An aperture hole A is formed in the center of primary mirror 12, providing a path for collimated light to secondary mirror 14.

One approach to mounting secondary mirror 14 in precise relationship to primary mirror 12 is to employ a "spider" support, the term commonly used for a mechanical mount with an arrangement of legs or struts that project radially outward from the secondary mirror to a supporting structure. For optics mounted within a cylindrical housing, the legs or struts of the spider support are typically fastened along the inner walls of the housing. Alternately, the spider support can suspend the secondary mirror from a support structure that is provided for the primary mirror or from points on the inner periphery of the primary mirror, as shown, for example, in U.S. Pat. No. 7,274,507 entitled "Two-Mirror Telescope with Central Spider Support for the Secondary Mirror" to Stenton et al.

A known technique for device fabrication is to machine the primary mirror surface, a flange orthogonal to the optical axis, and a pilot diameter in one operation. The spider support is then similarly machined to mount on the flange and fit the pilot diameter to a tolerance to assure proper alignment to maintain optical performance. These tolerances typically require special measurement equipment, and the machined components can be subject to unwanted binding or "galling" at assembly.

Precision alignment of the optical surfaces for the catoptric apparatus of FIG. 1 requires adjustment for centering and tilt. Decentration, in which the secondary mirror 14 is shifted off-axis but within its x-y plane, is unacceptable for many applications and correct alignment for centering is needed. Centering requirements for device centering can have resolutions of less than a few microns. Tilt about the center C is less critical for such systems, although it may cause vignetting. Tilt about the vertex of secondary mirror 14 can be a more significant problem. For many optical systems using this type of substantially concentric optical arrangement, centering and tilt alignment can require the work of a trained optics technician, working with an interferometer or other suitable instrumentation. This adds cost and complexity to manufacture. In addition, the use of fasteners and adjustment mechanisms for device alignment can introduce other problems, such as parasitic motion. Where extremes of temperature are encountered in device application, differences in coefficients of thermal expansion (CFE) can also jeopardize alignment.

There is, then, a need for an optical element mount for concentric optical components that simplifies the complexity and expense of component alignment.

SUMMARY

It is an object of the present invention to advance the art of optical component mounting and adjustment. With this object in mind, the present disclosure provides an optical apparatus comprising:

a primary optical element having a primary spherical optical surface with a primary center of curvature, wherein the primary spherical optical surface has a peripheral portion that extends outside a usable aperture of the optical apparatus;

a secondary optical element; and a mount that suspends the secondary optical element spaced apart from the primary optical element, wherein the mount comprises a plurality of leg sections, each leg section extending between the primary and secondary optical elements, wherein each leg section terminates in a spherical mating surface that rests against the peripheral portion of the primary optical element, and wherein the spherical mating surface has a mating surface center of curvature that is substantially concentric with the primary center of curvature.

The optical element mount disclosed herein uses spherical mating surfaces at the interface between the spider support and primary optical element, allowing a measure of adjustment with five degrees of freedom.

An advantage of the optical apparatus of the present invention is that it provides a fixed center point for rotation of the mount during assembly and alignment, an arrangement that improves optical performance and reduces or eliminates the need to adjust for decentration.

Another advantage of the optical apparatus in embodiments of the present invention is that its element mount allows an adhesive bond between the spider support and the primary mirror without requiring additional bond-gap tolerance for adhesive thickness. Another advantage relates to simplicity of alignment for multiple concentric optical components in an assembly.

One further advantage of the optical apparatus relates to fabrication using single-point diamond turning.

Other desirable objectives, features, and advantages of the disclosed invention may occur or become apparent to those skilled in the art. The invention is defined by the appended claims.

DETAILED DESCRIPTION

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or principles of operation.

In the context of the present disclosure, terms "top" and "bottom" are relative and do not indicate any necessary orientation of a surface, but are used simply to refer to and distinguish opposite surfaces for a component or block of material.

Where they are used, the terms "first", "second", and so on, do not necessarily denote any ordinal or priority relation, but may be used for more clearly distinguishing one element or time interval from another.

In the context of the present disclosure, the phrase "reflective surface" is used interchangeably with the term "mirror". As is familiar to those skilled in the optical design arts, a reflective surface can be formed from a number of different materials, including metals and dichroic and metal coatings, for example.

In the context of the present disclosure, two curved surfaces are considered to have "substantially concentric" curvature when their respective centers of curvature are the same or are separated by no more than about 5% of the radius of the larger curvature.

In the context of the present disclosure, the term "usable aperture" or "clear aperture" has its meaning as understood by those skilled in the optical arts and relates to that portion of an optical component or system that defines the intended light path for the system or component. Given this definition, a portion of an optical element or other feature is considered to be outside of the usable aperture when its position in the optical system imposes no constraint on the ray angles intended for useful light traveling through the system. Referring to the schematic diagram of FIG. 2, the relationship of primary mirror 12 to the usable or clear aperture is shown. Looking inward toward microscope objective 10, it can be appreciated that the intended light path for light reflected back from secondary mirror 14 covers an inner portion U of primary mirror 12, with the boundary of inner portion U indicated by a dashed circle. Given this arrangement, a peripheral portion P of the surface of primary mirror 12 is considered to lie outside of the usable aperture. As is described in more detail subsequently, embodiments of the present invention employ this area outside the usable aperture as a mounting datum.

Figure 1:
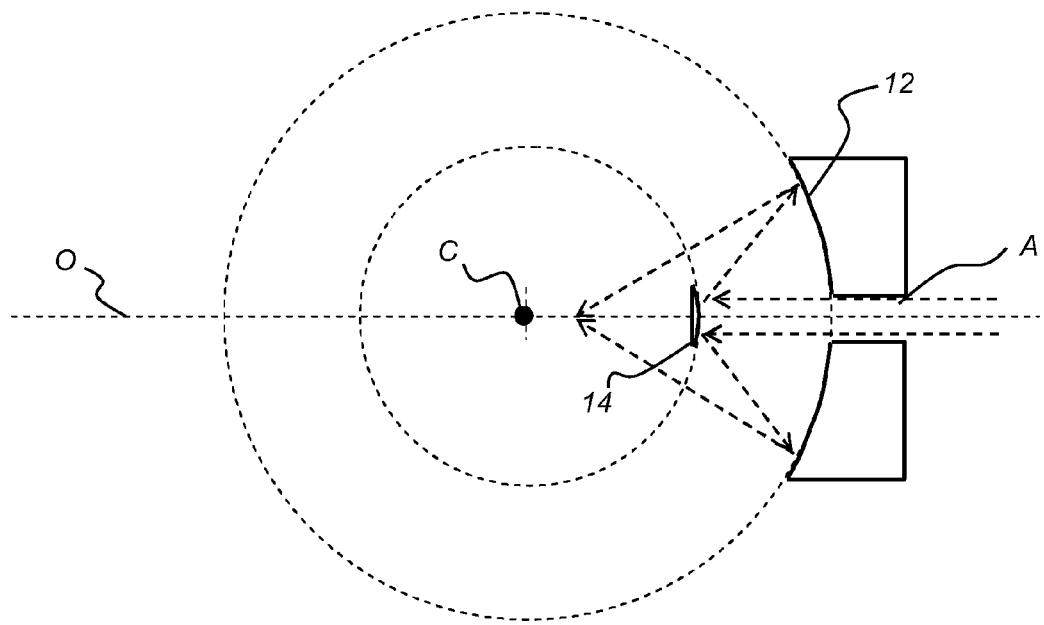
FIG. 1 is a schematic diagram showing basic optical components of a concentric catoptric system.
Figure 2:
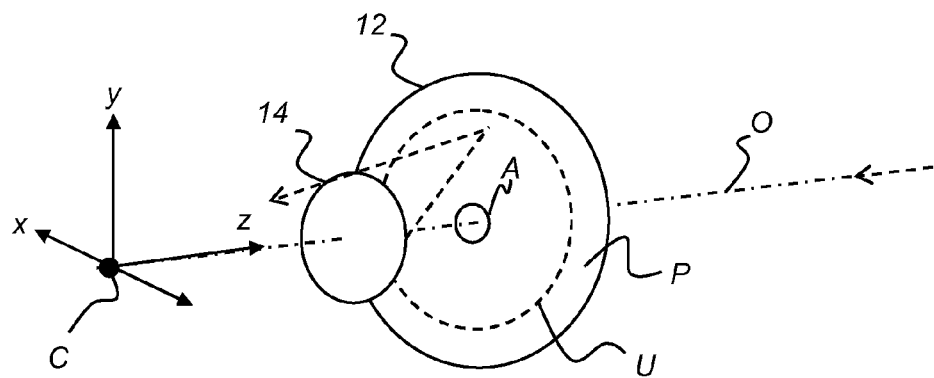
FIG. 2 is a schematic diagram showing the definition of a portion of a surface lying outside the useful aperture.

With reference to FIG. 2, the optical apparatus of the present invention can be adjusted for five degrees of freedom, allowing at least some measure of component movement in x and y directions and allowing some amount of rotation about any of the x, y, and z axes. Motion along the z axis (parallel to the optical axis O) is constrained.

Figure 3A:
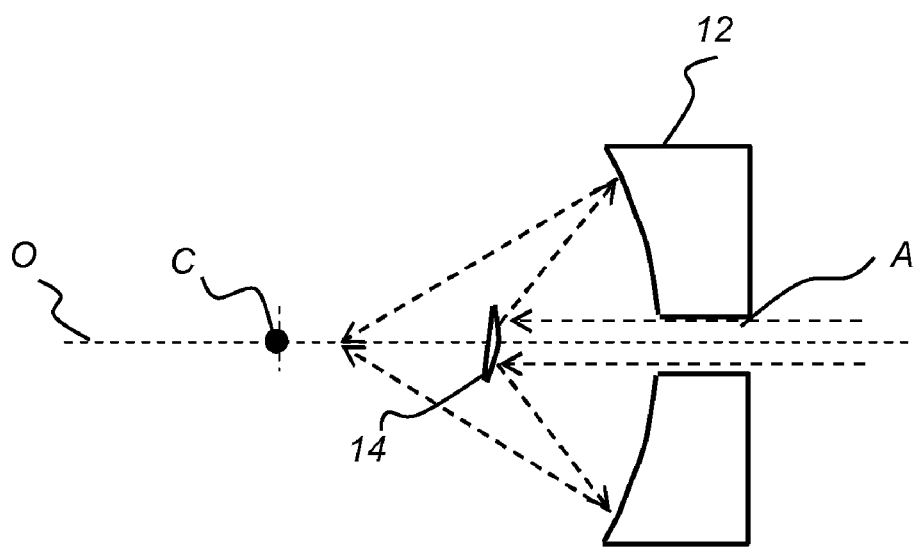
FIGS. 3A and 3B are schematic diagrams that show the effects of tilt about different reference points in a monocentric optical apparatus.
Figure 3B:
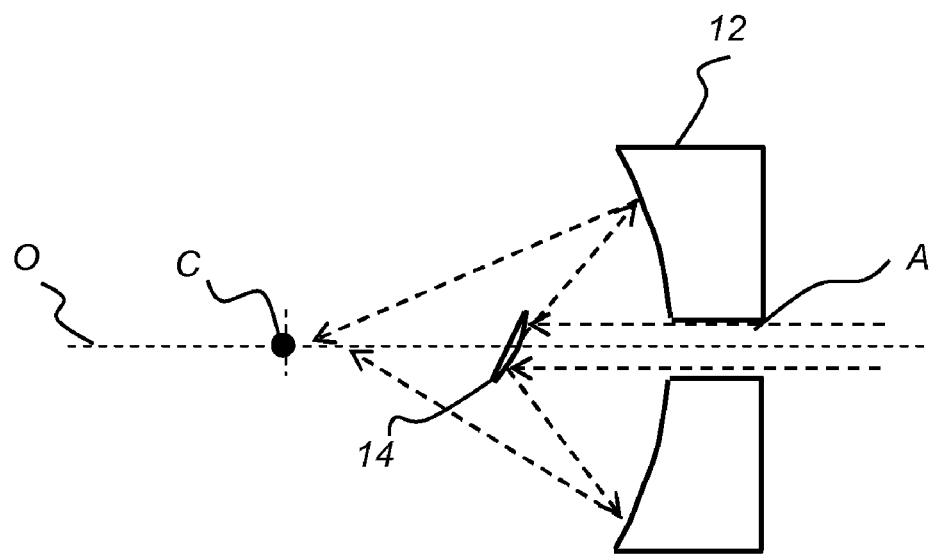

In order to more fully appreciate the practical difficulties of optical alignment for concentric or substantially concentric optical apparatus, it is useful to review two types of alignment errors in particular. Using the simplified schematic introduced in FIG. 1, FIGS. 3A, 3B, and 3C then show the effects of tilt and decentration in the optical path. Referring to FIG. 3A, tilt of spherical secondary mirror 14 about center of curvature C may have little or no effect on the handling of light in the optical path. With the tilt relationship shown in FIG. 3A, the center of curvature C remains substantially the same for both mirrors 12 and 14 and focus is maintained. Tilt beyond a certain angle would cause vignetting; however, some amount of tilt of this type can be tolerated with a spherical reflector. Referring to FIG. 3B, tilt of spherical secondary mirror 14 about a vertex point on the mirror surface can have more serious consequences and can degrade performance of the optical system. The incident light can be misdirected by the system optics and may not come to focus as intended. Geometrically considered, this type of tilt can effectively re-locate the center of curvature for secondary mirror 14, compromising the intended symmetry of the optical arrangement.

Figure 3C:
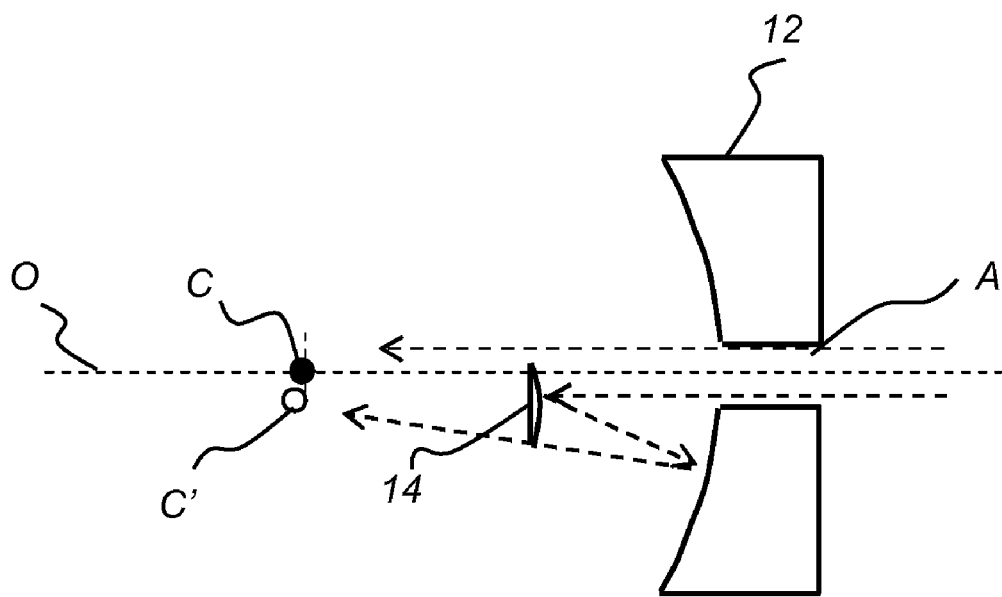
FIG. 3C is a schematic diagram that shows the effects of decentration in a monocentric optical apparatus.

One type of decentration is shown in the simplified schematic of FIG. 3C. Decentration effectively shifts the position of center of curvature C' for spherical secondary mirror 14 relative to center of curvature C for primary mirror 12.

Because it affects the geometric symmetry, any shift in component placement that effectively displaces the center of curvature away from the single point C, as shown in FIGS. 3B and 3C, is detrimental to the performance of microscope objective 10 or other optical apparatus that employ concentric design. Where this shift occurs, the incident light is misdirected by the system optics and may not come to focus as intended. Thus, it can be appreciated that while there can be some allowable tolerance for tilt about center of curvature C with the secondary mirror in the FIG. 1 arrangement, there is little tolerance for tilt about some other point or decentration.

Embodiments of the present invention address the positioning problem for concentric and substantially concentric systems by providing a mount that has interface surfaces with a curvature that is at least substantially concentric with surfaces of the optical components. With respect to the tilt and decentration problems described with reference to FIGS. 3A, 3B, and 3C, the apparatus and methods of the present invention allow the position of center of curvature C to remain fixed, minimizing or eliminating problems due to tilt and decentration as shown in FIGS. 3B and 3C. With the apparatus of the present invention, rotation is permitted only about the fixed center of curvature C.

Figure 4:
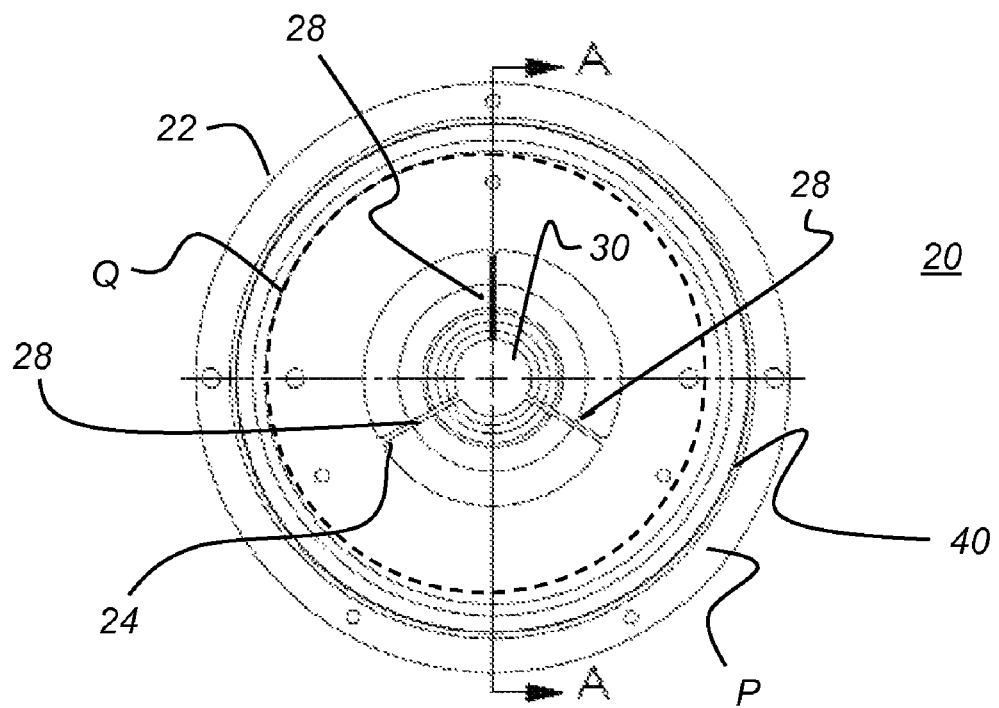
FIG. 4 is a plan view of a microscope objective according to one embodiment of the present invention.
Figure 5A:
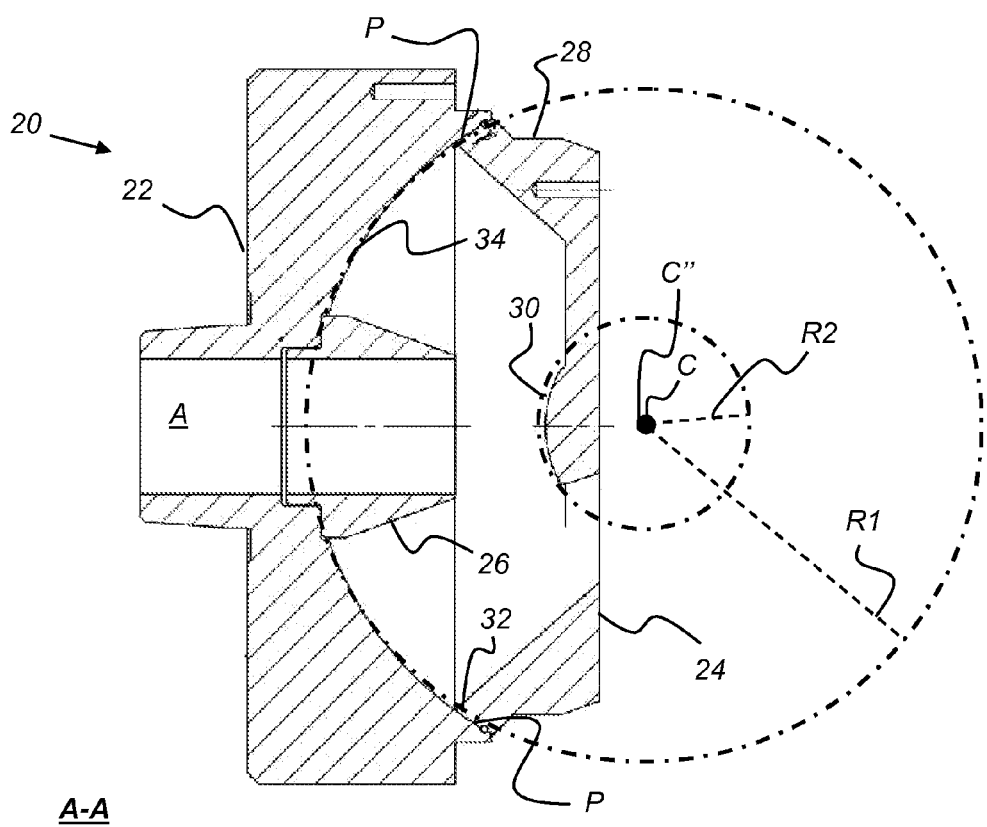
FIG. 5A is a side section view of the objective of FIG. 4 for an embodiment using a baffle.
Figure 5B:
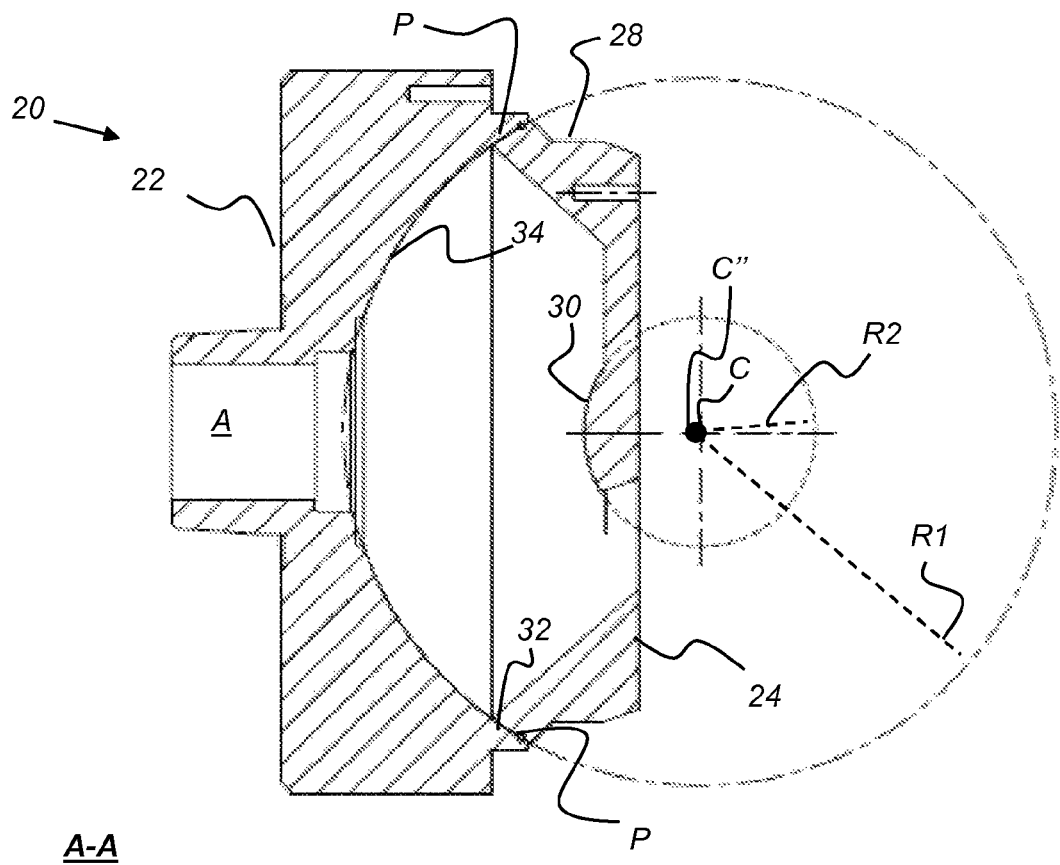
FIG. 5B is a side section view of the objective of FIG. 4 for an embodiment without a baffle.

Referring to the front view of FIG. 4 and to the sectioned side views of FIGS. 5A and 5B, there is shown an optical apparatus 20 in the form of a microscope objective following the Schwarzschild design. A primary optical element 22 is a mirror having a spherical optical surface 34. An optional baffle 26, shown in the embodiment of FIG. 5A and not in the embodiment of FIG. 5B, is formed as an insert that fits within aperture hole A. A mount 24 in the form of a spider support has a number of leg sections 28, three leg sections 28 that extend radially outward in the embodiment shown, and suspends a secondary mirror as a secondary optical element 30, spaced apart from the surface of primary optical element 22. Both the primary center of curvature for the reflective surface 34 of primary optical element 22 (with radius R1 in FIGS. 5A and 5B) and the secondary center of curvature for the reflective surface of secondary optical element 30 (with radius R2) are at C, or substantially at C. In an embodiment wherein secondary optical element 30 is an aspherical surface, the mathematically computed best-fit sphere to this surface has its center of curvature substantially at C.

Figure 6A:
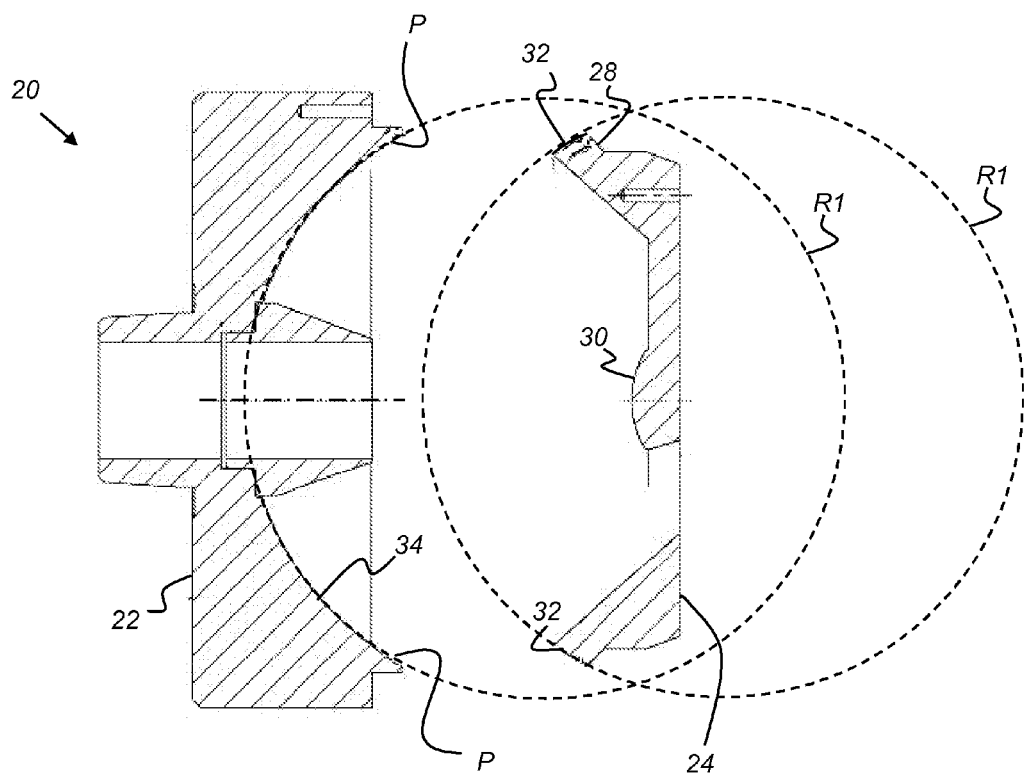
FIG. 6A is a side section view showing a mount removed from the surface of a primary optical element.
Figure 6B:
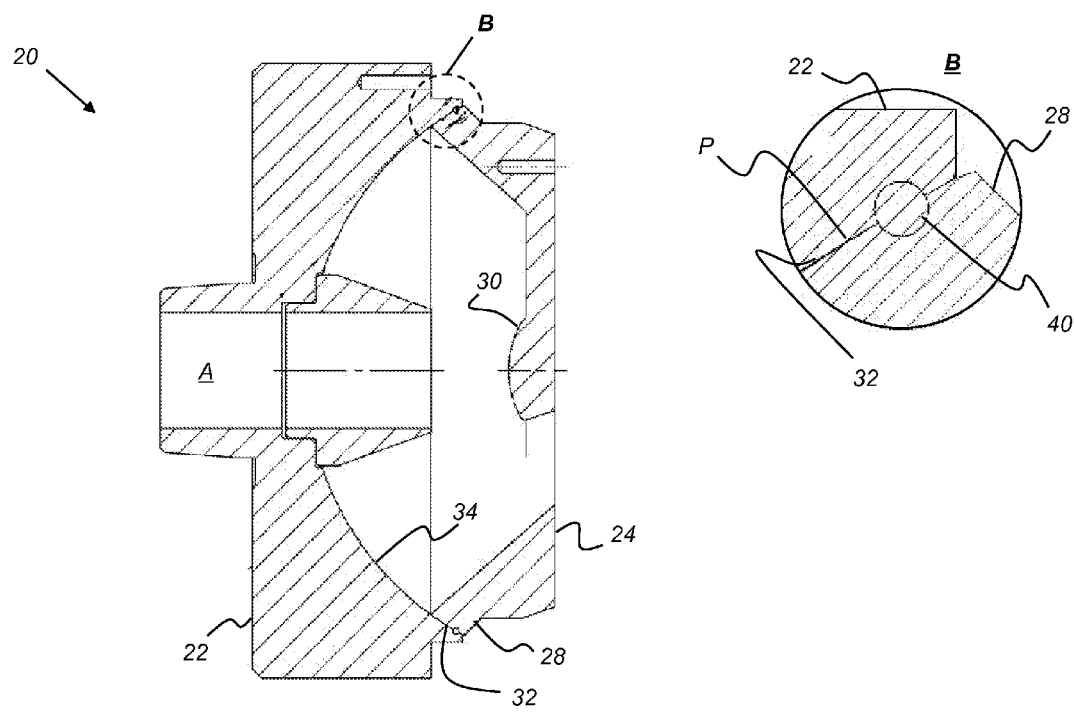
FIG. 6B is a side section view with an enlarged view showing an arrangement for adhesive bonding.

The respective exploded and assembled views of FIGS. 6A and 6B show the interface between mount 24 and surface 34 of primary optical element 22 in more detail. Each leg section 28 that extends outward from mount 24 terminates in a spherical mating surface 32 that rests against peripheral portion P of surface 34 on primary optical element 22. As noted earlier and defined with reference to FIG. 2, peripheral portion P lies outside the usable aperture of primary optical element 22. With reference to FIG. 4, peripheral portion P is that portion of the surface of primary optical element 22 that lies to the outside of a dashed circle Q.

As is best shown in FIGS. 5A and 5B, spherical mating surface 32 has a mating surface of curvature C" that is substantially concentric with both the primary and secondary centers of curvature at C. With this arrangement, the curvature of spherical mating surface 32 matches that of spherical surface 34. With reference to the exploded view of FIG. 6A, the same radius R1 is used for curvature of both mating surfaces.

With identical curvature of mating surfaces, simply placing mount 24 manually into position, with spherical mating surfaces 32 of mount 24 in contact against peripheral portion P of surface 34, can provide a sufficiently close coarse positioning of mount 24 and its supported secondary optical element 30. Only minor adjustment is then needed to correct for slight misalignment and for centering the optical components.

In order to provide this type of mounting capability, spherical surface 34 of primary optical element 22 must extend beyond the usable aperture, as was described previously with reference to FIG. 2. In some embodiments, this means that part of the mirrored surface, a peripheral portion of that surface as noted earlier, is used as a mounting surface. Thus, the mirrored surface 34 of primary optical element 22 is simply extended past the usable aperture when the part is formed. It can be appreciated that there may be advantages in fabrication cost and complexity by forming the complete curved surface first, then further treating or otherwise conditioning only that portion of spherical surface 34 that is actually used as a mirror.

Alignment and Bonding

A recurring problem with optical assemblies relates to adhesion and variation in bond-line thickness that can contribute to inaccurate positioning. Enlarged detail B in FIG. 6B shows an adhesion feature that is provided in embodiments of the present invention for simplifying the alignment and adhesion process and for helping to minimize or eliminate bond-line variability. As one type of alignment feature, an O-ring 40 is formed by features that lie along the intersection of mating surface 32 of leg 28 and peripheral portion P. Adhesive such as RTV (Room-Temperature Vulcanizing) silicone or other suitable material is then injected along the intersection of mating surface 32 and peripheral portion P or otherwise applied along O-ring 40 to lock the assembled components into position relative to each other. This bonding method provides shear strength over a considerable area. Adhesive bonding in this manner has a number of advantages over conventional mechanical bonding methods using fasteners, for example. It is instructive to note that the use of O-ring 40 or a similar alignment feature can reduce adhesion requirements at mating surfaces 32. Thus, a material deposited within O-ring 40 can be an adhesive or, alternately, can be a sealant, filler, or other material that solidifies within the space and has at least sufficient adhesion for securing mating surface 32 of mount 24 along peripheral portion P. In some cases, forming a solid that must be sheared to allow separability can be sufficient for securing mount 24 to primary optical element 22. While O-ring 40 is shown having a circular diameter in FIG. 6B, an alignment feature having an elliptical or other cross-sectional shape may offer additional advantages.

Embodiments of the present invention may also include peripheral alignment features, such as a detent or indent as a seating guide, that help to simplify both initial alignment of mount 24 to primary optical element 22 and adhesion of mount 24 into position once aligned.

The embodiments described and shown with reference to FIGS. 4-6B form a Schwartzchild-type microscope objective with concentric primary and secondary spherical mirrors. It can be readily appreciated that the apparatus and methods of the present invention can be similarly used for other types of concentric optical systems, such as other catoptric or all-reflective designs and with catadioptric optical systems that employ a mix of reflective and refractive components, as well as more generally with objective lenses and components designed using a concentric arrangement. By using a mount that has its mating surfaces concentric with centers of curvature for a primary optical element upon which the mount seats, and a secondary optical element that is suspended from the primary optical element, embodiments of the invention provide component positioning that significantly simplifies positioning, tilt, and decentration adjustment.

Fabrication

Optical apparatus 20 can be formed from any of a number of types of materials, including metal, plastic, glass, or ceramic materials, for example. Optical coatings and other treatments can be used to form or to condition optical surfaces of the apparatus, using processes and techniques familiar to those skilled in the optical component fabrication arts.

As described earlier with reference to FIGS. 4-6B, embodiments of the present invention form optical apparatus 20 by forming primary optical element 22 having a concave spherical surface with a curvature of a predetermined radius and having peripheral portion P, suspending secondary optical element 30 so that it is spaced apart from primary optical element 22 by forming mount 24 that comprises a number of leg sections 28, wherein each leg section 28 terminates in a mating surface 32 that has a convex spherical curvature of the predetermined radius. Mating surfaces 32 seat against the peripheral portion P of primary optical element 22.

There are a number of options for fabrication of components using the mounting apparatus and methods of the present invention. Precision single point diamond machining or diamond turning is one method that can be well-suited to the fabrication of a microscope objective as described herein. Single-point diamond turning permits optical surfaces, mounting surfaces, and alignment features to be created in a common operation, assuring precise relationships. For this processing, a pre-formed blank is first molded or machined, then diamond-turned to provide the required mating-surface precision. Other possible fabrication options include molding, laser machining, and additive fabrication methods, for example.

Configurations of an optical element mount have been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the primary optical element could have a convex rather than a concave curvature. The primary optical element can include multiple components. The secondary optical element could be essentially flat, such as an array of light modulating elements or sensors, a filter, a grating, a polarizer, or other component. The secondary optical element is integrally formed into the mount in one embodiment, such as a mirror element that is machined as part of the spider support. In an alternate embodiment, the secondary optical element is coupled to the mount during assembly, such as using an adhesive or mechanical coupling.

Thus, what is provided is an optical element mount that simplifies the complexity and expense of component alignment, particularly for concentric optical components.

The invention claimed is:

1. An optical apparatus comprising:
a primary optical element having a primary spherical optical surface with a primary center of curvature, wherein the primary spherical optical surface has a peripheral portion that extends outside a usable aperture of the optical apparatus;
a secondary optical element; and
a mount that suspends the secondary optical element spaced apart from the primary optical element, wherein the mount comprises a plurality of leg sections, each leg section extending between the primary and secondary optical elements, wherein each leg section terminates in a spherical mating surface that rests against the peripheral portion of the primary optical element,
and wherein the spherical mating surface has a mating surface center of curvature that is substantially concentric with the primary center of curvature.

2. The optical apparatus of claim 1 wherein the secondary optical element has a secondary curved optical surface with a secondary center of curvature that is substantially concentric with the primary center of curvature.

3. The optical apparatus of claim 1 wherein the primary optical element is a concave mirror.

4. The optical apparatus of claim 1 wherein the secondary optical element is a convex mirror.

5. The optical apparatus of claim 1 wherein the secondary optical element is taken from the group consisting of a sensor array, a grating, a filter, and a polarizer.

6. The optical apparatus of claim 1 wherein one or more leg sections are adhesively coupled to the peripheral portion of the primary spherical optical surface.

7. The optical apparatus of claim 1 wherein the secondary optical element is a refractive element.

8. The optical apparatus of claim 1 wherein the secondary optical element is integrally formed into the mount.

9. The optical apparatus of claim 1 wherein the primary optical element is coated.

10. The optical apparatus of claim 1 further comprising an alignment feature that is formed along the intersection of the spherical mating surface of the leg section and the peripheral portion of the primary spherical optical surface.

11. The optical apparatus of claim 1 wherein the secondary optical element has an aspherical surface and wherein a computed best-fit sphere to the aspherical surface of the secondary optical element is substantially concentric with the primary center of curvature.

12. A method for forming an optical apparatus comprising:
forming a primary optical element having a concave spherical surface with a curvature of a predetermined radius and having a peripheral portion;
suspending a secondary optical element spaced apart from the primary optical element by forming a mount that comprises a plurality of leg sections, wherein each leg section terminates in a mating surface that has a convex spherical curvature of the predetermined radius; and
seating the mating surfaces of the mount against the peripheral portion of the primary optical element.

13. The method of claim 12 wherein seating the mating surfaces comprises applying an adhesive between one or more of the mating surfaces and the concave spherical surface.

14. The method of claim 12 wherein forming the primary optical element comprises applying an optical coating to the concave spherical surface.

15. The method of claim 12 wherein suspending the secondary optical element comprises forming the secondary optical element as a part of the mount.

16. The method of claim 12 wherein suspending the secondary optical element further comprises coupling the secondary optical element to the mount.

17. The method of claim 12 wherein forming at least the primary concave spherical surface comprises using diamond turning.

18. The method of claim 17 further comprising forming at least the mating surfaces of the mount using diamond turning.

19. An optical apparatus comprising:
a primary reflective element having a concave primary spherical optical surface with a primary center of curvature, wherein the primary spherical optical surface has a peripheral portion that extends outside a usable aperture of the optical apparatus;
a convex secondary reflective element; and
a mount that suspends the secondary reflective element spaced apart from the primary reflective element, wherein the mount comprises a plurality of leg sections, wherein each leg section terminates in a spherical mating surface that rests against the peripheral portion of the primary reflective element, and wherein the spherical mating surface has a mating surface center of curvature that is substantially concentric with the primary center of curvature.

20. The optical apparatus of claim 19 wherein the convex secondary reflective element has a secondary center of curvature and wherein the secondary center of curvature is substantially concentric with the primary center of curvature.

* * * * *